May 12, 1936.  R. R. OSBORN  2,040,496
CONTROL MECHANISM FOR AUXILIARY WING FLAPS
Filed June 29, 1934
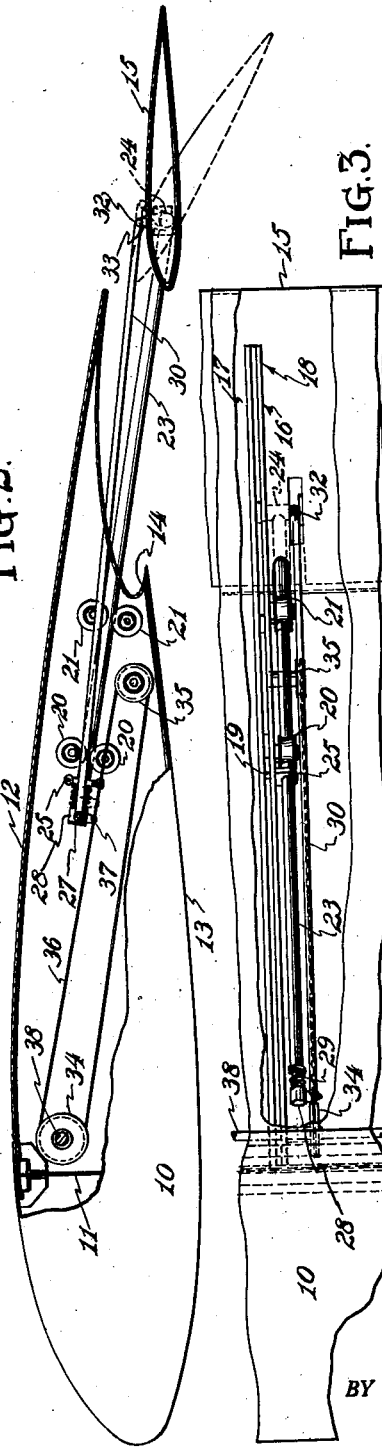
INVENTOR.
ROBERT R. OSBORN.
BY
ATTORNEYS.

Patented May 12, 1936

2,040,496

UNITED STATES PATENT OFFICE 2,040,496

CONTROL MECHANISM FOR AUXILIARY WING FLAPS

Robert R. Osborn, Kenmore, N. Y., assignor to Curtiss Aeroplane & Motor Company, Inc., a corporation of New York Application June 29, 1934, Serial No. 733,008

12 Claims. (Cl. 244—29)

This invention relates to aircraft control systems and is particularly concerned with improvements in operating means for trailing edge flaps movable with respect to the main lifting surfaces of airplanes.

In the extensive art of lift increasing devices for airplane or aircraft wings, there is a class of lift increasing device known as a trailing edge flap. Among the various forms which such flaps may take, is one in which an auxiliary airfoil may be normally nested adjacent the trailing edge of a wing and, when it is desired to increase the lift of the wing, this auxiliary airfoil is moved rearwardly and downwardly with respect to the wing, to lie in its final position in spaced relation thereto. Thereby, the effective chord of the basic wing is increased and the camber thereof may also be increased by tilting the auxiliary airfoil to a greater angle of incidence than that of the main wing. Among the methods for carrying auxiliary airfoils of this character are track and slide arrangements and hinged strut organizations, all of which, so far as applicant knows, require the use of fittings, braces and the like which lie outside of the normal contour of the wing. Such projections into the air stream are objectionable in that they increase the parasite drag of the aircraft as a whole, tending to reduce its ultimate speed. If carrying means for auxiliary airfoils of the character mentioned can be kept wholly within the main wing, when the wing is set for normal high speed flight, it is believed that a material contribution to the art has been made. The supporting means for the auxiliary airfoil, when the latter is moved to its lift increasing position will, of course, be in the air stream, but under such conditions the slight additional drag caused by the supporting structure is immaterial, since the high lift condition is only desired in relatively slow speed flight.

My invention provides a supporting and controlling structure for trailing edge auxiliary airfoils which, when the wing is set for high speed flight, lie wholly within the main wing.

Objects of the invention are to provide an enclosed trailing edge flap supporting structure, to provide means for projecting a trailing edge flap rearwardly and downwardly with respect to a main wing, and to provide control means by which the angle of incidence of the auxiliary flap may be changed with respect to the main wing.

Still another object is to provide control mechanism of the character described which is extremely simple and which utilizes a minimum number of parts.

Also, my controlling structure allows the use of a single control for extending, retracting, and changing the angle of incidence of the auxiliary trailing edge flap.

Further objects will become apparent in reading the specification and claims and in examining the drawing, in which:

Fig. 1 is a cross section of a conventional aircraft wing, embodying a trailing edge auxiliary airfoil and control mechanism therefor in accordance with this invention;

Fig. 2 is a section similar to Fig. 1 and showing the auxiliary airfoil in its extended position;

Fig. 3 is a plan of the wing, partly broken away, to show the operating mechanism;

Figs. 4, 5, and 6 are sections on the lines 4—4, 5—5, and 6—6, respectively, of Fig. 1.

The main wing 10 includes a main forward spar 11 to which the conventional ribs, not shown, may be attached, the upper and lower wing skins 12 and 13 being attached to these ribs in a conventional manner. The rearward portion 14 of the lower skin 13 is recessed to provide a pocket in which a trailing edge auxiliary airfoil 15 may be nested when the latter is retracted for high speed flight. Such recess 14 and auxiliary airfoil 15 may be coextensive with the wing span, or may, if desired, form only a portion of the total wing span. False ribs 16 are joined to and extend rearwardly from the spar 11, each comprising spaced sheets 17 and 18 having suitable brace elements 19 therein. To each false rib 16, a forward pair of pulleys 20 is pivoted. Spaced rearwardly from the first pair is a second pair of pulleys 21. Each pulley of each pair has a grooved surface as at 22 whereby a tube 23 is engaged by the pulley surfaces and is constrained by virtue of the pairs of pulleys to translation in a fore and aft direction. As shown, the pulley pair 21 is spaced rearwardly and below the pulley pair 20, so that as the tube 23 slides, it may extend downwardly and rearwardly with respect to the wing. The tube 23 extends through a cutout formed in the surface covering of the recess 14, and is pivoted at its rearward end as at 24 to the auxiliary airfoil 15 adjacent the normal center of pressure thereof. Thereby, the airfoil 15 may rock about the pivot 24 to allow changes of incidence of the airfoil 15 with respect to the main wing 10 when the airfoil is extended rearwardly by virtue of the extension of the tube 23 rearwardly of the wing. A stop element 25 is attached to the false rib 16 forwardly of the pulley pair 20 and, by virtue of a shoulder 26 formed on the tube 23, the rearward extension of the tube is limited. A second shoulder 27 is formed on the tube 23 forwardly of the shoulder 26 and between the two shoulders, a collar 28 is slidably mounted. A spring 29 takes up the remaining space between the collar 28 and the shoulder 26. To the collar 28 a rod 30 is pivotally mounted as at 31, this rod extending rearwardly through the covering of the recess 14, to a pivotal connection 32 at the upper end of a horn 33 carried by the airfoil 15. It will be noted that the tube pivot 24 and the rod pivot 32 are slightly spaced from one another. Within the wing a pair of sheaves 34 and 35 are mounted in spaced relation, and over the sheaves a cable 36 is passed. The upper run of the cable 36 is parallel to the tube 23 and a connection 37 is made between the collar 28 and the upper run of the cable 36. Means including a shaft 38 are provided to turn the sheaves 34, whereby the cable 36 may be moved.

Referring to Fig. 1, clockwise rotation of the shaft 38 will translate the upper run of the cable 36 rearwardly, carrying with it the collar 28. By virtue of the compressive force in the spring 29, both the tube 23 and the rod 30 are shifted rearwardly, carrying the airfoil 15 rearwardly from the wing 10, the angle of incidence of the airfoil 15 being held in substantially constant relationship with respect to that of the wing 10. Upon abutment of the shoulder 26 against the stop 25, the airfoil 15 will have reached its rearwardmost position. Further clockwise rotation of the shaft 38 will then force the collar 28 against the spring 29, thereby moving the rod 30 rearwardly with respect to the tube 23. Thereby, the angle of incidence of the airfoil 15, by virtue of the spaced pivots 24 and 32, is increased. The degree of turning of the shaft 38 will determine the extent of increase in angle of incidence of the airfoil 15. Upon counter-clockwise rotation of the shaft 38, initially the airfoil 15 will return to its normal incidence position, after which both the tube 23 and the rod 30 will be translated forwardly until the airfoil 15 nests within the recess 14. The forward translation of both of the elements 23 and 30 is effected by abutment of the collar 28 against the forward shoulder 27. It will be apparent to those skilled in the art that changes in the organization of the tube 23 and the rod 30 may be made to accomplish substantially the same result, and I do not desire to limit myself to the actual showing except as limited by the appended claims.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft wing having a recess in the lower rearward part thereof, a rod guided for rearward and downward movement relative to said wing and passing through the surface of said recess, an auxiliary airfoil pivotally connected to said rod for varying angles of incidence relative to the wing chord, and unitary means progressively operable to move said airfoil from said recess to a rearward position and then to tilt said airfoil to an increased angle of incidence relative to said wing after said airfoil has reached its extreme rearward position.

2. An aircraft wing having an auxiliary airfoil movable rearwardly and downwardly with respect thereto, a rod pivotally carrying said airfoil, said rod being movable from said wing to carry said airfoil to an extreme rearward position with respect to said wing, means operable after said airfoil has reached its extreme rearward position to tilt said airfoil with respect to said wing, and unitary control means acting on said rod and said tilting means for progressively extending and tilting said airfoil.

3. In an aircraft wing having an auxiliary airfoil, means within said wing for supporting and moving said airfoil relative to said wing, said means being movable to extend said airfoil rearwardly from said wing while maintaining constant the angular relationship between the wing and airfoil chords, and means for first operating said movable means and for then changing said angular relationship after said airfoil has been rearwardly extended from said wing.

4. In an aircraft wing a rod guided for movement within and rearward of said wing, an abutment on said rod, a member engaging said rod and movable relative thereto, a spring between said member and said abutment, an auxiliary airfoil carried by and swingable relative to said rod, said airfoil having a horn, a connection from said horn to said member, and means for moving said member.

5. A mounting for controlling an airfoil mounted adjacent the trailing edge of a wing comprising a pair of rods pivoted in spaced relation to said airfoil, guide means for one said rod within said wing, a sliding connection between said rods at a point remote from their connection with said airfoil, and operating means for moving one said rod.

6. A mounting for controlling an airfoil mounted adjacent the trailing edge of a wing comprising a pair of rods pivoted in spaced relation to said airfoil, guide means for one said rod within said wing, a sliding connection between said rods at a point remote from their connection with said airfoil, operating means for moving one said rod, and a stop on one said rod adjacent said sliding connection for limiting the extent of relative movement between said rods.

7. A mounting for controlling an airfoil mounted adjacent the trailing edge of a wing comprising a pair of rods pivoted in spaced relation to said airfoil, guide means for one said rod within said wing, a sliding connection between said rods at a point remote from their connection with said airfoil, operating means for moving one said rod, a stop on one said rod adjacent said sliding connection for limiting the extent of relative movement between said rods, and a spring between said stop and said connection.

8. A mounting for controlling the extension and angle of incidence of an auxiliary airfoil comprising a pair of substantially parallel rods translatable with respect to a wing and pivoted to said airfoil at spaced apart points, means connecting said rods at their anti-pivot ends for relative reciprocation, and a single control element connected to one said rod for translating both said rods with said airfoil.

9. A mounting for controlling the extension and angle of incidence of an auxiliary airfoil comprising a pair of substantially parallel rods translatable with respect to a wing and pivoted to said airfoil at spaced apart points, means connecting said rods at their anti-pivot ends for relative reciprocation, a single control element connected to one said rod for translating both said rods with said airfoil, and resilient means acting between said rods for urging them toward one extreme of their relative reciprocation.

10. A mounting for controlling the extension and angle of incidence of an auxiliary airfoil with respect to a wing comprising a pair of substantially parallel members translatable together with respect to said wing, a lost motion connection between said members to permit of relative translation thereof, resilient means urging said members toward one extreme of their relative translation, spaced apart pivot connections between the respective members and said airfoil, and a control element acting on one said member for translating both said members and said airfoil with respect to said wing and for then translating said members with respect to each other.

11. In an aircraft wing, guide means within said wing, support means translatable in said guide means, an auxiliary airfoil movable with and with respect to said support means, and unitary control means progressively operable to first move said support means and airfoil relative to said wing and to then move said airfoil relative to said support means.

12. In an aircraft wing support means movable between extended and retracted positions, in a fixed path relative to said wing, an auxiliary airfoil mounted on said support means for movement with and with respect thereto, and a unitary control means progressively operable to first move said support means and auxiliary airfoil, together, relative to said wing, to the extended position of said support means, and to then move said auxiliary airfoil relative to said support means.

ROBERT R. OSBORN.